Aug. 21, 1928. 1,681,385
A. U. AVERA
TRANSMISSION OF POWER TO VEHICLES
Filed July 13, 1922 3 Sheets-Sheet 2
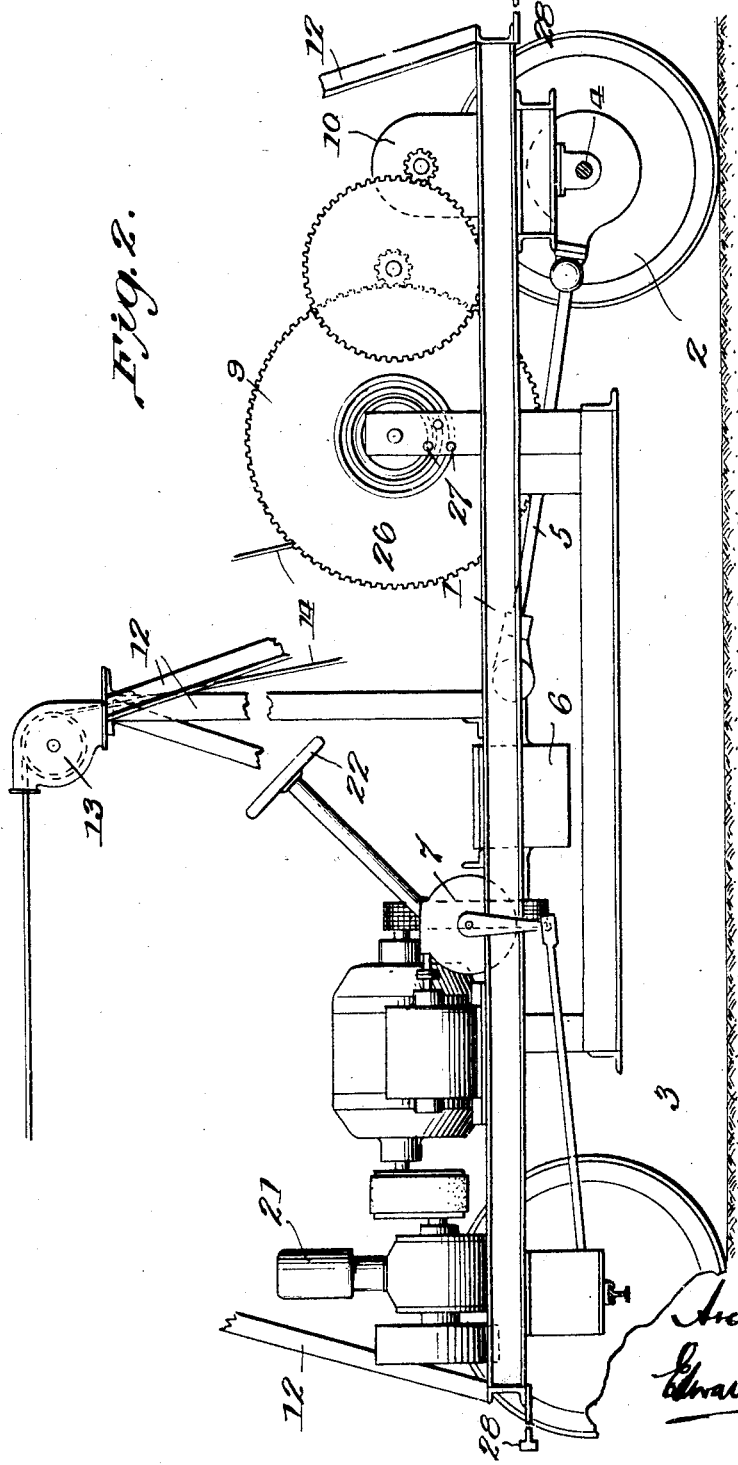

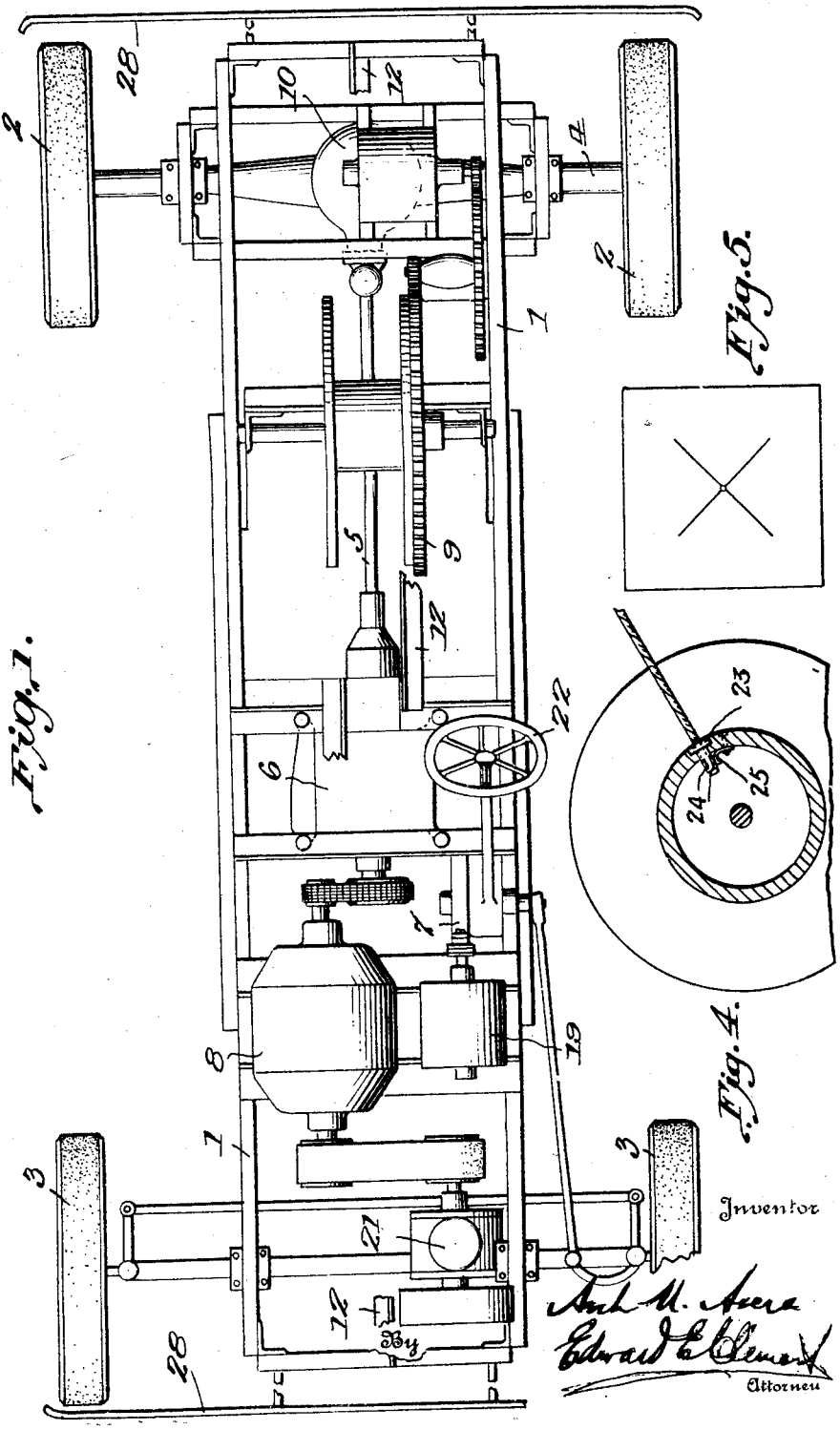

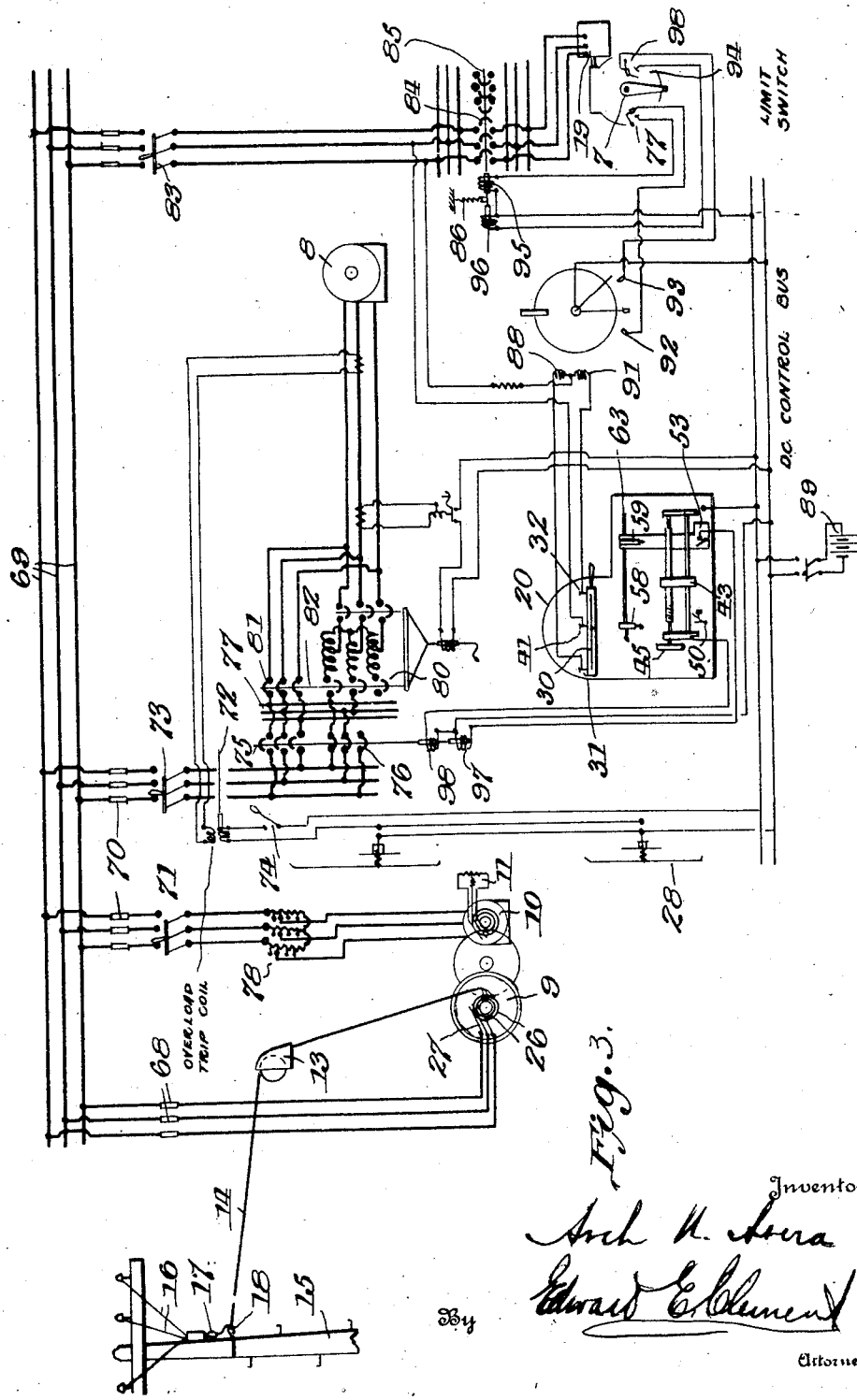

Patented Aug. 21, 1928.

1,681,385

UNITED STATES PATENT OFFICE.

ARCH U. AVERA, OF BIRMINGHAM, ALABAMA.

TRANSMISSION OF POWER TO VEHICLES.

Application filed July 13, 1922. Serial No. 574,724.

My invention relates to electrical vehicles, and more especially to the transmission of power thereto.

The main object of the invention is to provide an arrangement for maintaining a cable connection between the vehicle and a stationary source of power with a minimum amount of strain and wear on the cable and without interference with the movement of the vehicle.

The invention is illustrated in the accompanying drawings in which:

Fig. 1 is a plan view of a preferred form of an automatic electric tractor with certain portions removed or broken away for the sake of clearness;

Fig. 2 is a side view of Fig. 1 with the upper end of the cable mast added;

Fig. 3 is a circuit diagram of the tractor shown in Figs. 1 and 2;

Fig. 4 is a detail sectional view of the drum showing the cable attachment plug;

Fig. 5 is a diagram of the field of operation of a machine of the type shown in Figs. 1 and 2.

Referring to the drawings in detail, and first to Figs. 1 and 2, the running gear includes the frame 1 of the machine, driving wheels 2, steering wheels 3, driving axle 4, propeller shaft 5, reduction gears 6 and steering gear 7.

The main drive motor 8, in the present instance, is a three phase, 440 volt, 15 horse power, 60 cycle, 1800 R. P. M., squirrel cage, induction motor, but may be any known or other suitable type of polyphase induction motor of the correct voltage, speed and power for the purpose.

A cable drum 9 is geared to a slip ring, polyphase induction motor 10, the rings of which are connected to resistances 11 (Fig. 3) of such value that the full load torque of the motor occurs at approximately zero speed.

A mast 12 (Fig. 2) projecting about 22 feet above ground level is mounted on the machine frame and carries on its top an enclosed swiveled sheave or pulley 13 designed to pass the 3-conductor feeding cable 14 in any direction with reference to the frame of the tractor.

A fixed pole 15 (Fig. 3) about 60 feet high supports at its top the power line wires 16 to which is connected the feeding cable 14 of the tractor through a three contact socket and plug connection 17 mechanically connected to the pole through an insulated detachable hook 18, which plug and hook connections may be of any known or other suitable form.

Implements such as plows, harrows or the like suitable for utilization with a straight line reversing drive are to be carried by the frame of the machine of Figs. 1 and 2.

For moving the tractor when it is out of operating radius from a source of electric power, a small gasoline engine 21 with removable belt drive to main drive motor is provided. When so driven, the machine is steered by the hand wheel 22.

For the sake of clearness, the circuit connections are omitted from Figs. 1 and 2, and for a clear understanding of such connections reference is to be had to Fig. 3 which will be later described.

To insure against breaking of the cable in case of over travel of the machine, I connect it with the cable drum 9 by means of a three pole plug and socket connection as shown in detail in Fig. 8 where 23 indicates the plug which is provided with three contacts 24 connected to the cable conductors and cooperating with three spring conducting brushes 25 (only one shown) connected to slip rings 26 (Fig. 2) with which connection is made through suitable brushes indicated at 27 (Fig. 2). When tension on the cable is in a direction substantially perpendicular to the axis of the plug, as will be the case when the cable starts to wind up, the plug will stay in place, but when the cable has unreeled completely with tension still maintained, the pull exerted by the cable will be parallel to the axis of the plug which will cause the plug to disengage. Thus is provided an automatic disconnect switch to stop the tractor without breaking the cable in case of over travel. To insure proper connection of the complementary plug and socket contacts, the plug is made triangular, oval, square or otherwise suitably shaped to prevent turning on its axis.

Referring now to the circuit diagram, Fig. 3, the power supply of the tractor starts with the 3-pole plug attached to the stationary pole 15.

From the plug and socket 17 the 3-phase electric power is conveyed through cable 14 to the cable drum 9 of the tractor, thence through the three contact rings 26 to connecting brushes 27, thence through protective fuses 68 to the main power bus 69 of the tractor.

Power for the motor 10 furnishing torque for the cable drum is tapped off this bus through fuses 70, a triple pole lever switch 71 and an auto-transformer 78 with taps for adjusting potential of the motor to obtain the desired tension on cable. The slip rings of the motor 10, as stated before, are connected to resistances 11 of such value that the maximum torque occurs at or near zero speed. The action of this motor, then, is to maintain a certain torque on the cable drum to pay out cable when its torque is exceeded by stress exerted when the tractor moves away from the fixed pole, or to take up cable when the tension is lowered by the tractor approaching the pole. At the time of maximum span of cable, the cable drum will be nearly empty, giving the minimum radius, which radius (about 3 inches) determines the torque required for maintenance of strain on the cable. As the tractor approaches the fixed end of the cable the cable drum fills up, thereby exerting a smaller strain on the cable. This condition is favorable, as at that time the span is shorter than before and the strain required is less. The size of motor required should be based on the maximum cable strain with a minimum radius (about 3 inches) and a total over-all efficiency of 65 per cent more or less for gearing.

In place of the slip ring motor described for maintaining a substantially constant torque on the cable drum, I may use a polyphase induction motor without slip rings but with a high resistance secondary winding on the rotor.

On direct current circuits, a series or shunt wound motor may be used equipped with external resistance in series with the motor, such as will limit the flow of current to full load value at zero motor speed. Also on direct current circuits, a series or shunt motor may be used having an internal resistance (in field and armature) high enough to limit the flow of energy to such a value, at zero motor speed, as may be dissipated in heat without excessive resultant temperatures.

I claim:

1. The combination with an electrically driven vehicle, of a cable for feeding power thereto, a drum on which said cable is reeled to take up slack in the cable, circuit connections terminating in contacts carried by said drum and a contact plug terminal for said cable arranged to be moved radially of the drum into and out of engagement with said contacts and frictionally held in engagement therewith whereby the plug may be removed by a radial pull thereon but will be locked against disengagement by the tangential pull exerted thereon when the cable is reeled.

2. The combination with an electrically driven vehicle of a flexible cable for feeding power thereto, one end of said cable being connected to a source of power, and a drum carried on said vehicle adapted to receive and wind the other end of the cable, an electric motor adapted to maintain a constant torque on said drum, and thereby maintain a strain on the cable, and connections to the motive mechanism of the vehicle from contact terminals on the drum, and means maintaining said cable end in connection with said contact terminals as long as there is any cable wound on the drum, against the torque of said motor, but acting to disconnect the cable when the same is fully unwound.

3. In combination with an electrically driven vehicle a source of power, a flexible conducting cable connected thereto at one end, extending to said vehicle at the other, a cable reel carried on the cable and an electric motor therefor maintaining a substantially constant torque on the reel, said reel having its drum so proportioned that the radial distance from its center to any particular layer of the cable wound on the reel is substantially proportional to the amount of cable unwound and requiring power on the part of the motor to keep it taut, and is inversely proportional to the amount of such power required.

In testimony whereof I hereunto affix my signature.

ARCH U. AVERA